United States Patent
Kapusta

(10) Patent No.: US 11,860,770 B2
(45) Date of Patent: Jan. 2, 2024

(54) SYSTEM AND METHOD FOR PERFORMANCE REGRESSION DETECTION

(71) Applicants: Atlassian Pty Ltd., Sydney (AU); Atlassian Inc., San Francisco, CA (US)

(72) Inventor: Dominik Kapusta, Gdansk (PL)

(73) Assignees: ATLASSIAN PTY LTD., Sydney (AU); ATLASSIAN US, INC., San Francisco, CA (US)

( * ) Notice: Subject to any disclaimer, the term of this patent is extended or adjusted under 35 U.S.C. 154(b) by 587 days.

(21) Appl. No.: 17/080,672

(22) Filed: Oct. 26, 2020

(65) Prior Publication Data

US 2021/0042218 A1 Feb. 11, 2021

Related U.S. Application Data

(63) Continuation of application No. 16/457,090, filed on Jun. 28, 2019, now Pat. No. 10,824,548.

(51) Int. Cl.
G06F 11/36 (2006.01)
G06F 11/34 (2006.01)

(52) U.S. Cl.
CPC .................. *G06F 11/3688* (2013.01)

(58) Field of Classification Search
CPC ............... G06F 11/36; G06F 11/3688
See application file for complete search history.

(56) References Cited

U.S. PATENT DOCUMENTS

| | | | |
|---|---|---|---|
| 8,199,152 B2 * | 6/2012 | Sullivan | G06T 13/20 345/473 |
| 10,031,831 B2 | 7/2018 | Greene et al. | |
| 10,212,058 B2 | 2/2019 | Aly Salama et al. | |
| 10,891,128 B1 * | 1/2021 | Tafas | G06F 11/3672 |
| 11,042,692 B1 * | 6/2021 | Greisen | G06F 40/14 |
| 2004/0225390 A1 * | 11/2004 | Keller | G06Q 10/06 700/95 |
| 2005/0240943 A1 | 10/2005 | Smith | |
| 2009/0055805 A1 | 2/2009 | Dow et al. | |
| 2010/0005341 A1 | 1/2010 | Agarwal et al. | |
| 2013/0129086 A1 * | 5/2013 | Tang | H04L 63/0435 380/44 |
| 2013/0145349 A1 * | 6/2013 | Basak | G06F 11/3495 717/121 |
| 2014/0040869 A1 | 2/2014 | Park et al. | |
| 2015/0186253 A1 * | 7/2015 | Abraham | G06F 11/3409 717/124 |
| 2019/0294596 A1 * | 9/2019 | Yan | G06F 16/24568 |
| 2019/0310931 A1 * | 10/2019 | Ocariza, Jr. | G06F 11/3466 |

* cited by examiner

*Primary Examiner* — Getente A Yimer
(74) *Attorney, Agent, or Firm* — Brownstein Hyatt Farber Schreck, LLP

(57) ABSTRACT

A method and system for detecting performance regression in a software application is disclosed. The software application comprises a feature flag having at least two states, wherein in a first state a first version of a feature is provided and in a second state a second version of the feature is provided when the software application is executed. The feature flag is further wrapped in a timer for recording the time taken for the corresponding first and second versions of the feature to be provided.

20 Claims, 3 Drawing Sheets

SYSTEM AND METHOD FOR PERFORMANCE REGRESSION DETECTION

CROSS-REFERENCE TO RELATED APPLICATION(S)

This application is a continuation patent application of U.S. patent application Ser. No. 16/457,090, filed Jun. 28, 2019 and titled "System and Method for Performance Regression Detection," the disclosure of which is hereby incorporated herein by reference in its entirety.

TECHNICAL FIELD

Aspects of the present disclosure are directed to performance regression detection and in particular to automatically detecting performance regression in software systems.

BACKGROUND

Software systems or applications are continuously updated/changed, e.g., to include feature extensions or program enhancements and/or to fix bugs in the software application. The updates are usually meant to improve the overall performance of the software application. However, sometimes these updates may unexpectedly cause performance issues in the corresponding software application. Such performance issues, which cause the software application to function correctly, but perform slower than before or use more database or CPU resources than before, are called software performance regressions.

SUMMARY

As noted above, performance issues that cause the software application to function correctly, but perform slower than before or use more database or CPU resources than before, are called software performance regressions. If a performance regression is perceptibly large—e.g., the regression increases the load time of a web page by 500 ms, it may be easy to identify the corresponding source code changes that lead to this regression. Similarly, if only one major change was made to the source code in the recent past, a regression can be easily identified and attributed to the right source code changes. However, when the regressions are small (e.g., 20-50 ms) and the underlying source code is updated multiple times by multiple software development teams in a given day, it becomes difficult to determine which updates are responsible for the regressions. Further, these regressions may build slowly, incrementing by a few milliseconds each time, until the aggregate regression becomes perceptible. However, by that time it often becomes difficult to identify how much each source code update contributes to the overall performance regression of the software application.

The instant application describes a method and system for detecting performance regression in a software application. The software application comprises a feature flag having at least two states, wherein in a first state a first version of a feature is provided and in a second state a second version of the feature is provided when the software application is executed. The feature flag is further wrapped in a timer for recording the time taken for the corresponding first and second versions of the feature to be provided. The method comprises retrieving event log data for the feature flag, and retrieving timer event log data corresponding to the feature flag. For each state of the feature flag, the method further determines an estimated time taken for providing the corresponding version of the feature and determines whether the feature has regressed in performance by comparing the estimated time taken for providing the first version of the feature in the first state with the estimated time taken for providing the second version of the feature in the second state.

Figure 1:
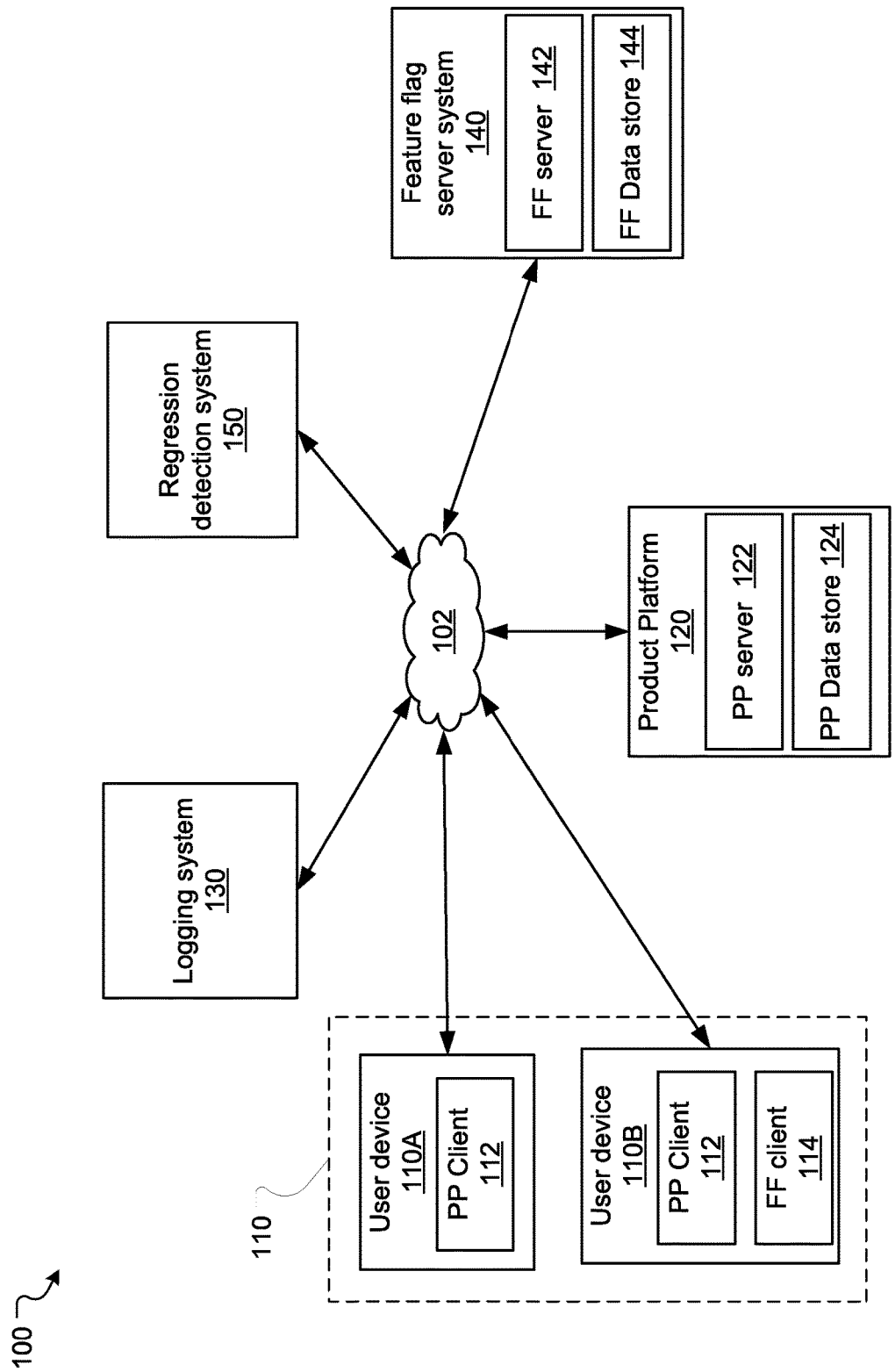
FIG. 1 is a block diagram illustrating a network environment in which aspects of the present disclosure may be implemented.

While the invention is amenable to various modifications and alternative forms, specific embodiments are shown by way of example in the drawings and are described in detail. It should be understood, however, that the drawings and detailed description are not intended to limit the invention to the particular form disclosed. The intention is to cover all modifications, equivalents, and alternatives falling within the spirit and scope of the present invention as defined by the appended claims.

DETAILED DESCRIPTION

In the following description, for the purposes of explanation, numerous specific details are set forth to provide a thorough understanding of the present invention. It will be apparent, however, that the present invention may be practiced without these specific details. In some instances, well-known structures and devices are shown in block diagram form to avoid unnecessary obscuring.

In recent decades, a number of software development best practices have emerged. One such practice is the use of feature flags (also referred to as, for example, feature toggles, feature switches, conditional features). A given feature flag relates to deployed source code, which (on execution) provides one or more features in a software product. In its simplest form, a feature flag essentially provides a conditional logic wrapper to the feature that enables it to be switched on (i.e., made available) or off (i.e., made unavailable). For example, when a feature flag is set to true, the software product when executed makes the feature(s) associated with that flag available. Conversely, when a feature flag is set to false, the software product when executed makes the feature(s) associated with that flag unavailable. This provides software developers the ability to control whether features included in a deployed/released code base are available or unavailable to customers (i.e., end users of the software product). A simplified example of a feature flag is illustrated in Table A—

TABLE A

Example Feature Flag

```
if (isFeatureFlagOn("featureflagKey")) {
    runNewCode( );
} else {
    runOldCode( );
}
```

Feature flags are often used to roll out a code refactoring, which is the process of restructuring existing software code, i.e., changing the factoring of the code, without changing its external behavior, e.g., to improve code readability, simplify code structure, improve performance, extensibility, etc. Consider the example of a piece of software code in an issue tracking system, such as Jira, that sequentially loads issues from a database. It may be inefficient to load issues one-by-one. To rectify this, a developer may decide to refactor this piece of software code such that all active issues are loaded using one database call. In this scenario, the developer could use a feature flag to progressively switch from the old implementation to the new implementation.

In addition to code refactoring, feature flags can be used to introduce a new feature. In such cases, feature flags may be utilized to incrementally roll out the new feature to ensure that addition of the feature does not adversely affect the software application. Similarly, feature flags can be used to remove a feature. In such cases, feature flags may be utilized to roll back the feature incrementally to ensure that removal of the feature does not adversely affect the software application.

As used in this disclosure, the term feature refers to a unit of functionality offered by a software application that is either visible to users (e.g., a behavior of a software application in response to a user input, etc.) or not visible to users (e.g., a background task that removes unnecessary records from a database). Further, the term old feature or original feature refers to a feature that is provided when the original or old code is compiled and executed and the term new feature refers to the feature that is provided when the new code is compiled and executed.

The use of feature flags provides a number of advantages. For example, feature flags allow software developers granular control over how a given feature is actually made available to customers. Using a feature flag, delivery of a feature may be controlled, for example, to specific customers, customers in a specific user tier, customers in a particular geographic region, customers with a particular product configuration, or a set number/percentage of random customers. This allows for software testing and user acceptance testing by a selected group or segment of customers before the feature is rolled out to a wider customer base. As another example, where availability of a feature is controlled by a feature flag, the feature can easily be rolled back (made unavailable) in the event that customer feedback is sufficiently negative or an issue with the feature is identified.

Various software products/systems have been developed to assist with using feature flags—for example LaunchDarkly® and Rollout®. For ease of reference, products/systems such as these will be referred to as feature flag systems. Generally speaking, feature flag systems provide mechanisms for creating feature flags and controlling the roll out and roll back of features enabled by feature flags. In LaunchDarkly, for example, roll out of a feature is controlled by customizable target rules, which dictate when, and to what users/user groups, features behind feature flags are made available. The rules associated with active feature flags may be forwarded to the computing system (server and/or user device) that is configured to execute the software application such that the computing system can determine based on the rules associated with a feature flag which version of the feature to provide when the feature is invoked.

In addition to feature flags, in recent years, developers have also begun to use timers in their code. Similar to a feature flag, a timer may be used as a wrapper around certain functionalities. For example, a timer can be wrapped around a piece of code, e.g., an update, a new feature, and/or an enhancement along with a feature flag. At runtime, whenever the corresponding feature is invoked, the timer starts before and stops right after that particular feature finishes executing. An event log of the time taken to execute the feature may then be created and stored along with a unique identifier of the timer. In this manner, a timer can be used to determine how long a particular piece of code or a corresponding feature takes to execute. This provides software developers the ability to monitor execution times and to determine whether changes to the source code improve performance or not. When timers are used in conjunction with feature flags, the timers can be linked to the feature flags, e.g., by employing the same identifier for the timers as that used for the corresponding feature flag. A simplified example of a timer is illustrated in table B. As shown in this table, the timer t can have the same identifier "featureflagKey" as the corresponding feature flag.

TABLE B

Example timer

```
Timer t = new Timer("featureflagKey");
t.start( );
if (isFeatureFlagOn("featureflagKey")) {
    runNewCode( );
} else {
    runOldCode( );
}
t.stop( );
```

Embodiments of the present disclosure are directed to systems and methods for utilizing these feature flags and timers in the underlying source code to identify and determine performance regression caused by portions of the source code and to identify the developer/team responsible for the corresponding source code. In particular, for every feature flag in the source code, using the corresponding timer, the systems and methods monitor the time taken by the corresponding feature to execute with the feature flag turned on (i.e., when the new feature is executed) and with the feature flag turned off (i.e., when the original feature is executed) in a particular period of time. If for a given feature flag it is determined that the corresponding feature takes longer to execute with the feature flag tuned on than it did with the feature flag turned off, the systems and methods determine that the performance of the feature associated with that given feature flag has regressed. Alternatively, if it is determined that the feature takes a shorter period of time to execute with the feature flag turned on than it does with the feature flag turned off, the systems and methods disclosed herein determine that the feature associated with that given feature flag has improved in performance.

Further still, the systems and methods disclosed herein may be configured to generate an alert upon detecting a performance regression and may forward the generated alert to the developer(s)/user(s) associated with the corresponding feature flag. In this manner, the disclosed systems and methods can identify even small performance regressions and can notify the responsible party so that corrective action can be taken.

In certain embodiments, an alert is only generated if the regression (i.e., the difference in execution times between the original feature and the new feature) is above a threshold value (e.g., 10 ms) or varies by a threshold percentage (10%). Any regressions below this threshold value are ignored.

An overview of one example environment illustrating different systems involved in certain embodiments will be described, followed by a description of a computer system, which can be configured in various ways to perform the embodiments/various features thereof as described herein. Operations for detecting performance regression will then be described.

Environment Overview

FIG. 1 illustrates an example environment 100 in which embodiments and features of the present disclosure are implemented. In particular, FIG. 1 illustrates the systems and platforms that may be utilized to detect performance regression. Example environment 100 includes a communications network 102, which interconnects one or more user devices 110, a product platform 120, a feature flag server system 140, a logging system 130 and a regression detection system 150.

For ease of reference, the acronym FF will be used herein in place of "feature flag".

In general, the product platform 120 is a system entity that hosts one or more software applications and/or content. The platform 120 may include one or more servers 122 for hosting corresponding software application(s) and one or more storage devices 124 for storing application specific data. Examples of software applications hosted by product platforms 120 may include interactive chat applications (e.g., Slack™, Stride™) collaborative applications (e.g., Confluence™), software code management systems (e.g., Bitbucket™), and issue tracking applications (e.g., Jira™). Jira, Confluence, BitBucket, and Stride are all offered by Atlassian, Inc. It will be appreciated that the software applications need not be offered by the same organization and that the presently disclosed invention can be used with any product platform.

In order to run a particular application, the product platform server 122 includes one or more application programs, libraries, APIs or other software elements that implement the features and functions of the application. For example, in case the product platform 120 is an issue tracking system such as Jira, the server 122 allows users to perform various actions with respect to issues—for example, create issues, associate issues with projects and/or other issues, transition issues between workflow states, add/edit information associated with issues, assign issues to specific people/teams, view issues, and/or search for issues. The issue tracking system also allows for management of an issue, for example, user permissions defining: users that can see an issue and its associated information; users who can edit an issue; users who can transition an issue into/out of a particular workflow state; users who should be automatically notified any time an issue changes (either any change or a particular change), etc.

While single server architecture has been described herein, it will be appreciated that one or more of the product platform server 122 can be implemented using alternative architectures. For example, in certain cases a clustered architecture may be used where multiple server computing instances (or nodes) are instantiated to meet system demand. Conversely, in the case of small enterprises with relatively simple requirements, a product platform 120 may be a stand-alone implementation (i.e., a single computer directly accessed/used by the end user).

The product platform server 122 may be a web server (for interacting with web browser clients) or an application server (for interacting with dedicated application clients). While the product platform 120 has been illustrated with a single server 122, in some embodiments it may provide multiple servers (e.g., one or more web servers and/or one or more application servers).

The FF system 140 (as described previously) provides mechanisms for creating FFs and controlling the rollout and rollback of features enabled by FFs. Further, the FF system 140 may communicate the rules associated with active FFs to the product platform 120 such that the product platform 120 can execute the correct feature (e.g., the original feature or the new feature) at execution time based on the FF rules. In addition to this, in some cases, the FF system 140 may receive event log data from the product platform 120 related to the usage of the FFs during execution. This log data may include, e.g., a count of the number of times the FF was switched on and off within a given period and/or operating environment.

In order to perform these functions, the FF system 140 includes an FF server 142 and an FF data store 144. The FF server 142 configures the FF server system 140 to provide server side functionality—e.g., by receiving and responding to requests from FF clients (e.g., client 114) and storing/retrieving data from the FF data store 144 as required. The FF data store 144 stores the information related to FFs. This information may include, e.g., for each FF, a unique identifier for the FF, an FF name, the rules associated with the FF, the owner of the FF and/or any other users/developers associated with the FF.

Further still, the FF system 140 may require an organization associated with the product platform to register a product account and developer accounts with the FF system 140 such that any FFs created by developers from the organization can be associated with the developer that created the FF and with the corresponding product platform 120. The product and developer account information is also stored in the FF data store 144.

The FF server 142 may be a web server (for interacting with web browser clients) or an application server (for interacting with dedicated application clients). While FF server system 140 has been illustrated with a single server 142, it may provide multiple servers (e.g. one or more web servers and/or one or more application servers).

In certain embodiments, FF server system 140 is a scalable system including multiple distributed server nodes connected to the shared data store 144 (e.g. a shared file server). Depending on demand from clients (and/or other performance requirements), FF server system 140 server nodes can be provisioned/de-provisioned on demand to increase/decrease the number of servers offered by the FF server system 140. Each FF server 142 may run on a separate computer system and include one or more application programs, libraries, APIs or other software that implement server-side functionality. Similarly, FF data store 144 may run on the same computer system as FF server 142, or may run on its own dedicated system (accessible to FF server(s) 142 either directly or via a communications network).

The user device 110, e.g., user device 110A may be utilized by consumers to access the product platform 120. Further, the user device 110, e.g., user device 110B may be utilized by developers to update/change a software application offered by the product platform 120, e.g., to include feature extensions or program enhancements and/or to fix bugs in the software application.

When the user device 110 is utilized by a consumer of the product platform 120, the user device 110 has a product platform client 112 installed and/or executable thereon. The user device 110 may also have other applications installed/ running thereon, for example, an operating system and a source code management/development client.

When executed by the user device 110, the product platform client 112 configures the user device 110 to provide client-side product platform functionality. This involves communicating (using a communication interface such as 218 described below) with the product platform 120. The product platform client 112 may be a dedicated application client that communicates with the product platform 120 using an API. Alternatively, the product platform client 112 may be a web browser (such as Chrome, Safari, Internet Explorer, Firefox, or an alternative web browser) which communicates with the product platform 120 using http/https protocols.

When the user device 110B is utilized by a developer to change/update a software application offered by the product platform 120, the user device 110 includes an FF client 114 in addition to the product platform client 112. The FF client application 114 configures the user device 110 to provide client-side FF system functionality. This involves providing a communication interface between the user device 110 and the FF system 140 (and, in particular, the FF server 142). In some examples, the FF client 114 may provide an interface for a developer to create a new FF or manage an existing FF. In addition, the FF client 114 may communicate with the FF server 140 to allow a developer to view the performance of an FF, for example. The FF client 114 may be a dedicated application client that communicates with the FF server 142 using an API. Alternatively, FF client 114 may be a web browser, which communicates with an FF web server using http/https protocols.

While user device 110B has been shown with separate product platform and FF clients 112 and 114, a single application may be used as both a product platform and an FF client (e.g., a web browser, in which case the product platform and FF servers are web servers).

User device 110 may be any form of computing device. Typically, user device 110 is a personal computing device—e.g., a desktop computer, laptop computer, tablet computer, and in some instance even a mobile phone. While only two user devices 110 have been illustrated, an environment would typically include multiple user devices 110 used by consumers for interacting with the product platform 120 and multiple user devices used by developers for updating software applications hosted by the product platform 120 and creating/managing FFs using the FF system 140.

The product platform 120 and the product platform client 112 (running on the user device 110) operate together to provide the functionality offered by the product platform 120. For example, consumers may utilize the product platform client 112 to access and/or interact with the products/services offered by the product platform 120.

Similarly, the FF server 142 (running on FF system 140) and FF client 114 (running on user device 110) operate together to provide FF system functionalities. For example, the FF server 142 and the FF client 114 may operate together to allow a developer to create a new FF, manage a, FF, create an account, etc. FF operations involving the display of data (e.g., performance metrics for a feature flag) involve the user device 110 as controlled by the FF client 114. The data displayed, however, may be generated by the FF server 142 and communicated to the FF client 114. Similarly, FF operations involving user input (e.g., to create an FF) involve the user device 110 receiving user input (e.g., at input device 214 of FIG. 2) and passing that input to the FF client 114 to create and store the feature flag e.g., in the FF data store 144. The information input may be processed by the FF client 114 itself, or communicated by the FF client 114 to the FF server 142 to be processed by the FF server 142. FF operations involving writing data to the FF data store 144 involve the FF server 142. The data written to the FF data store 144 may, however, be communicated to the FF server 142 by the FF client 114.

Returning to FIG. 1, the logging system 130 stores event log data associated with the product platform 120. For example, each time a user device 110 interacts with a product/service offered by the product platform 120, the product platform may generate an event log and forward the event log for storing in the logging system 130. The event log may include e.g., the time of the interaction, the particular type of interaction, a user ID of the user attempting the interaction (if available), status of the interaction (e.g., successful, unsuccessful), etc. The product platform 120 can configure the type of event data that it captures and stores. Further, the product platform 120 can configure the frequency at which it captures and stores event data. For example, in some cases the product platform may only capture and store event data for failures and/or if an operation takes longer than a threshold time to execute or times out. In other cases, the product platform may only capture and store event data for a small percentage of interactions (e.g., one in every 1000, one in every 100, etc.).

Examples of event log data include application logs (i.e., a log of each time an application is accessed), and performance data logs (e.g., a log of the state of the CPU, disk, memory, etc., when an application is accessed).

In addition to this, the logging system 130 stores log data associated with active FFs and log data corresponding to timers in the executed code. For example, if on execution a particular user action, the product platform server 122 or client 112 encounters an FF, the event log data may include a unique identifier of the FF, a state of the FF (e.g., true or false), and any performance data related to execution of the feature(s) corresponding to the FF.

Similarly, if during execution of a particular user action (e.g., opening a webpage), the product platform server 122 or client 112 encounters one or more timers in the executable code, the product platform 120 may determine the time taken to perform the corresponding feature and then create a timer event log including, e.g., a unique identifier of the timer, the time taken to execute the feature, and (if available) the identifier of any FF associated with the feature and the state of the FF, or an identifier of the feature executed (e.g., the original feature or a new feature). A simplified example of an event log is shown in Table C below.

TABLE C

Example event log

{
    tenantId: XXXX,
    requestId: YYYY,
    feature_flag_states: {
        feature_flag_1: true,
        feature_flag_2: false,
        ...
    },
    timers: {
        feature_flag_1: 100,
        feature_flag_2: 200,
        ...
    },
    url: "/editIssue.jsp",
    time: "2018-08-09T11: 12: 39Z"
}

The example event log depicted in table C includes:
- A tenantID which is a unique identifier for the product platform associated with that event,
- A requestID which is a unique identifier for the event log,
- Feature flag states, which include the states for the feature flags that were invoked during execution of the event. For each feature flag, the feature flag states include the unique identifier of the feature flag and the state of the feature flag (i.e., true=feature flag on, false=feature flag off). In this example, feature flag 1 was turned on and feature flag 2 was turned off.
- Timers, which include the time taken (in milliseconds) to execute the functionalities wrapped in timers during execution of the event. For each timer, this includes the unique identifier of the timer (which is the same as the unique identifier for the corresponding feature flag) and the time taken to provide the feature. In this example, time taken to provide the new feature wrapped in feature flag 1 is 100 ms and the time taken to execute the original feature wrapped in feature flag 2 is 200 ms,
- A uniform resource locator (URL) of the software application where the event was logged, and
- The time at which the event was logged.

The product platform 120 can configure the type of event data that it captures and stores in the logging system 130. Further, the product platform 120 can configure the frequency at which it captures and stores event data. For example, in some cases the product platform may only capture and store event data for failures and/or if an operation takes longer than a threshold time to execute or times out. In other cases, the product platform may only capture and store event data for a small percentage of events (e.g., one in every 1000, one in every 100, etc.).

One example of a logging system is Splunk®. However, the embodiments described herein are not limited to be used with Splunk and can be used with any other data logging system or database. In certain embodiments, the logging system 130 indexes the log data before storing so that the log data can be easily searched and retrieved. Further, in these embodiments, the logging system 130 includes a search engine (not shown) which may be queried to retrieve data logs.

The regression detection system 150 detects performance regressions (if any) in a software application (e.g., a software product or service) offered by the product platform 120. To this end, the regression detection system 150 communicates with the FF system 140 and the logging system 130 to retrieve data associated with FFs and timer event data, respectively. The regression detection system 150 then analyzes the retrieved timer event data to determine whether the performance of the software application offered by the product platform 120 has regressed or improved. Operations of the regression detection system 150 will be described in detail with reference to FIG. 3.

In FIG. 1, the regression detection system 150 is illustrated as a system separate from the product platform 120. However, in some embodiments, the regression detection system 150 may be executed by the product platform 120 and, in these embodiments, the regression detection system 150 may form a part of the product platform 120 itself. Further, in other embodiments, the regression detection system 150 may be executed on or form part of the FF system 140. In these embodiments, the FF system 140 may directly communicate with the logging system 130 or the product platform 120 to retrieve timer event logs corresponding to the FFs maintained by the FF system 140 to determine whether the rollout of a feature has resulted in a regression or an improvement.

Communications between the various systems in environment 100 are via the communications network 102. Communications network 102 may be a local area network, a public network (e.g. the Internet), or a combination of both.

While environment 100 has been provided as an example, alternative system environments/architectures are possible.

The embodiments and features described herein are implemented by one or more special-purpose computing systems or devices. For example, in environment 100 each of the user device 110, the product platform 120, the logging system 130, the FF system 140, and/or the regression detection system 150 is or includes a type of computing system.

A special-purpose computing system may be hard-wired to perform the relevant operations. Alternatively, a special-purpose computing system may include digital electronic devices such as one or more application-specific integrated circuits (ASICs) or field programmable gate arrays (FPGAs) that are persistently programmed to perform the relevant operations. Further, alternatively, a special-purpose computing system may include one or more general-purpose hardware processors programmed to perform the relevant operations pursuant to program instructions stored in firmware, memory, other storage, or a combination.

A special-purpose computing system may also combine custom hard-wired logic, ASICs, or FPGAs with custom programming to accomplish the relevant operations described herein. A special-purpose computing system may be a desktop computer system, a portable computer system, a handheld device, a networking device or any other device that incorporates hard-wired and/or program logic to implement relevant operations.

Figure 2:
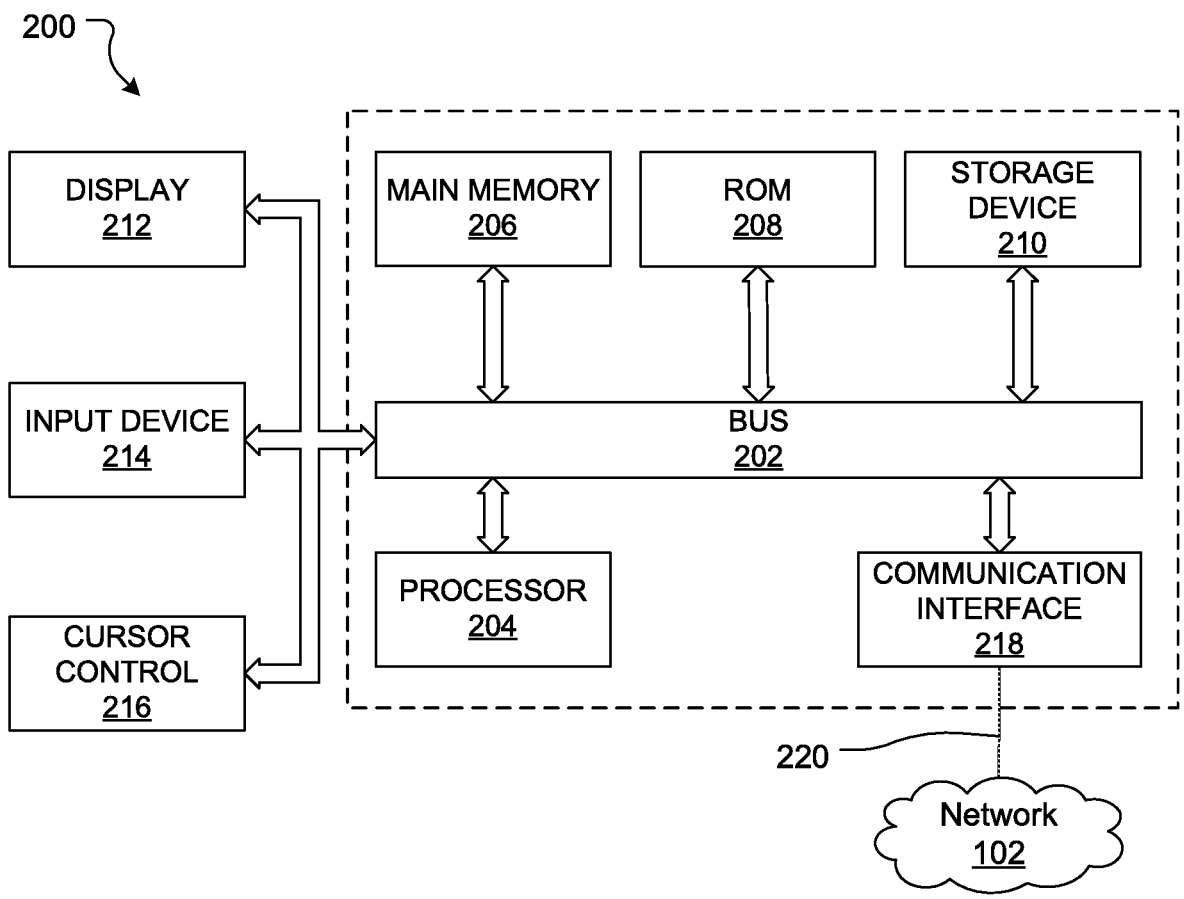
FIG. 2 is a block diagram of a computing system with which various embodiments of the present disclosure may be implemented.

By way of example, FIG. 2 provides a block diagram that illustrates one example of a computer system 200, which may be configured to implement the embodiments and features described herein. Computer system 200 includes a bus 202 or other communication mechanism for communicating information, and a hardware processor 204 coupled with bus 202 for processing information. Hardware processor 204 may be, for example, a general-purpose microprocessor, a graphical processing unit, or other processing unit.

Computer system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. Such instructions, when stored in non-transitory storage media accessible to processor 204, render computer system 200 into a special-purpose machine that is customized to perform the operations specified in the instructions.

Computer system 200 further includes a read only memory (ROM) 208 or other static storage device coupled to bus 202 for storing static information and instructions for processor 204. A storage device 210, such as a magnetic disk or optical disk, is provided and coupled to bus 202 for storing information and instructions.

In case the computer system 200 is the user device 110, the computer system 200 may be coupled via bus 202 to a display 212 (such as an LCD, LED, touch screen display or other display), for displaying information to a computer user. An input device 214, including alphanumeric and other keys, may be coupled to the bus 202 for communicating information and command selections to processor 204. Another type of user input device is cursor control 216, such as a mouse, a trackball, or cursor direction keys for communicating direction information and command selections to processor 204 and for controlling cursor movement on display 212.

According to one embodiment, the techniques herein are performed by computer system 200 in response to processor 204 executing one or more sequences of one or more instructions contained in main memory 206. Such instructions may be read into main memory 206 from another storage medium, such as a remote database. Execution of the sequences of instructions contained in main memory 206 causes processor 204 to perform the process steps described herein. In alternative embodiments, hard-wired circuitry may be used in place of or in combination with software instructions.

The term "storage media" as used herein refers to any non-transitory media that stores data and/or instructions that cause a machine to operate in a specific fashion. Such storage media may comprise non-volatile media and/or volatile media. Non-volatile media includes, for example, optical or magnetic disks, such as storage device 210. Volatile media includes dynamic memory, such as main memory 206. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, or any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 202. Transmission media can also take the form of acoustic or light waves, such as those generated during radio wave and infrared data communications.

Computer system 200 also includes a communication interface 218 coupled to bus 202. Communication interface 218 provides a two-way data communication coupling to a communication network, for example communication network 102 of environment 100. For example, communication interface 218 may be an integrated services digital network (ISDN) card, cable modem, satellite modem, etc. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Computer system 200 can send messages and receive data, including program code, through the network(s) 102, network link 220 and communication interface 218.

As noted, computer system 200 may be configured in a plurality of useful arrangements, and while the general architecture of system 200 may be the same regardless of arrangements, there will be differences. For example, where computer system 200 is configured as a server computer (e.g., such as product platform 120, logging system 130, FF system 140, or regression detection system 150), it will typically be provided with higher end hardware allowing it to process data, access memory, and perform network communications more rapidly than, for example, a user device (such as device 110).

The various systems and platforms depicted in FIG. 1 communicate with the other systems in network 100 via suitable communication networks 102. For example, the user devices 110 may communicate with the product platforms 120 via public networks, whereas the regression detection system 150 may communicate with the FF system 140 and/or the logging system 130 via one or more private or public networks. It will be appreciated that based on the required implementation, any suitable communication networks 102 may be utilized to allow communication between the systems in environment 100.

Performance Detection Process

Figure 3:
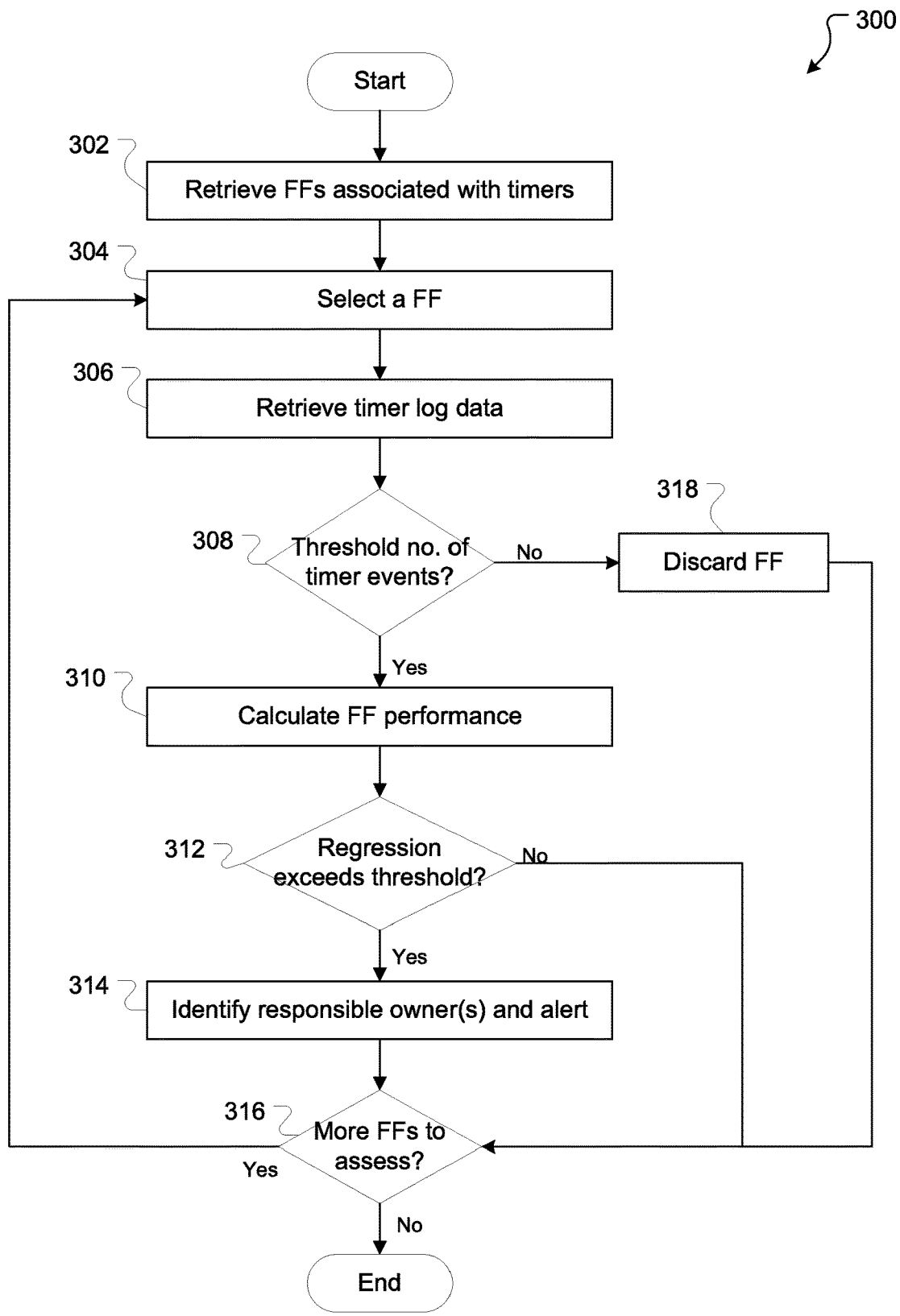
FIG. 3 is a flowchart illustrating an example method for detecting performance regression in a software system according to some aspects of the present disclosure.

FIG. 3 is a flowchart illustrating an example method 300 for detecting performance regression in a software application using one or more of the systems described with reference to FIG. 1. This method is described with respect to a single software application. However, it will be appreciated that in actual implementation the method can be scaled to detect performance regression in multiple software applications.

At step 302, FFs associated with a product platform/software application are retrieved. In some embodiments, the regression detection system 150 communicates with the logging system 130 to retrieve event logs corresponding to FFs that have corresponding timers for a particular product platform 120. For example, if the product platform 120 is a Jira platform, the regression detection system 150 may request the logging system 130 to retrieve and forward event logs stored in the logging system 130 that include feature flags that have corresponding timers and correspond to the Jira platform.

In some embodiments, the regression detection system 150 may request the logging system 130 to forward the event logs corresponding to all the FFs associated with a requested product platform account. In other embodiments, the regression detection system 150 may request the logging system to forward relevant data pertaining to these feature flag event logs instead of forwarding the entire event logs the logging system 130 maintains for the product platform 120.

For example, the regression detection system 150 may request the logging system 130 to forward a list of unique identifiers for the FFs that have corresponding timers. Along with the unique identifiers for the FFs, the regression detection system 150 may request the logging system 130 to forward the state of the FFs, a count of the number of times the FF was executed in a threshold period of time, a count of the number of times the FF was turned on and/or a count of the number of times the FF was turned off in that threshold period of time, a rollout percentage of the FF, and/or a count of the number of times timer samples were recorded for a particular FF. It will be appreciated that the above example data fields are illustrative and that any other data fields associated with the FFs may also be considered relevant and could be retrieved at this step.

One example query used by the regression detection system 150 to retrieve the FFs that have corresponding timers is depicted in Table D and an example result received from the logging system is shown in Table E. It will be appreciated that the result shows the relevant data for a single FF, but in other embodiments, the result includes relevant data for multiple FFs.

TABLE D

Example query to retrieve FFs that have corresponding timers search $env_filter JiraMetricsLogger message="Metrics [jira.request.metrics.work-context-metrics]" |
fields + ext.jira.request.metrics.feature_flag_metrics |
spath output=flags path=ext.jira.request.metrics.feature_flag_metrics | fields - _raw |
rex field=flags "\"(?<f>[\"]*)\":\"(?<v>[\"]*)\"" max_match=0 |
eval fields = mvzip(f,v) | mvexpand fields| makemv delim="," fields | eval f = mvindex(fields, 0), v = mvindex(fields, 1) |
where v in("true", "false", "OLD", "NEW", "CHECK_RETURN_NEW", "CHECK") |
eval v=if(v="OLD", "NEW", v) |
eval v=if(v="CHECK_RETURN_NEW", "CHECK", v) |
stats count as countByFV by f, v |
evenstats sum(countByFV) as countByF by f |
eval countByF = if(v="CHECK_RETURN_NEW" OR v="CHECK", countByF + countByFV, countByF) |
where countByFV!=countByF AND v!="false" AND v!="OLD" |
eval countByF=if(v="NEW", 0, countByF) |
eval v=if(v="CHECK", "NEW", v) |
stats sum(countByFV) as countByFv, sum(countByF) as countByF by f, v|
eval percent=(countByFV/countByF)*100 |
table f v countByFV countByF percent |
sort f |
join f [search $env_filter JiraMetricsLogger message="Metrics [jira.request.metrics.work-context-metrics]" | fields + ext.jira.request.metrics.work-context-metrics.timers | spath output=fields path=ext.jira.request.metrics.work-context-metrics.timers | fields - _raw
| rex field=fields "\"(?<f>[\"]*)\":\{" max_match=0
| mvexpand f
| stats count as ct by f]

TABLE E

Example output f,v,countByFV,countByF,percent,ct
gdpr-1395-user-store-use-combined-cache,true,87908,175816,50,12606

In the tables above, f is the unique feature flag identifier. In the example above, this is "gdpr-1395-user-store-use-combined-cache". V is the feature flag state, i.e., whether the flag controlling the code switch was on or off. In the example above, this is set to 'True' (i.e., the output corresponds to the FF where the FF was turned on and the new feature was provided. CountByFV indicates the number of times the corresponding feature was executed when the FF state was true. In the example above, this value is 87908. CountByF indicates the number of times the corresponding feature was executed in total (i.e., with the FF turned on or off). In the example above, this value is 175816. Percent indicates the rollout percentage of the FF. This value is determined based on the values of the CountByF and CountByFV values (e.g., percent=countByF*100/countByFV). In the example above, this value is 50%. Ct indicates the number of timer samples that were produced for that feature flag. As noted previously, the product platform may not record event data for each event and may only capture and store event data for a small percentage of events (e.g., one in every 1000, one in every 100, etc.). Accordingly, timer data may not be available for each feature flag execution. This field indicates the number of available timer samples for that feature flag. In this example, the ct value is 12606.

At step 304, an FF from the list of FFs received at step 302 is selected. Next, at step 306, timer log data corresponding to the selected FF is retrieved. As described previously, timers may be incorporated in the source code and wrapped around certain features—e.g., the same features that are wrapped in FFs. To link the FFs and the corresponding timers, developers may utilize the same identifier for the timers and the corresponding FFs. Each time the feature wrapped in a timer is executed (i.e., the old feature or the new feature, depending on the state of the associated FF), the time taken to provide the feature is determined by the product platform 120 and at least a percentage of these timer events are recorded and stored as event logs. At step 306, the regression detection system 150 retrieves these timer event logs for the selected FF from the logging system 130.

In some embodiments, the regression detection system 150 retrieves timer event logs for events that were recorded in a predetermined period of time. It will be appreciated that many factors can affect the performance of a particular application—e.g., the operating system of the user device, the available memory at the user device, network connectivity, server bandwidth, etc., can all have an effect on the performance times of a particular application and/or a particular feature. Accordingly, it is unwise to make this determination based on a single event instance. The more number of event instances that can be used in the analysis, the better. Accordingly, timer event logs recorded for a particular period of time are retrieved. This period of time is configurable and can be based on the requirements of the systems involved.

In one example, the period of time may be the period corresponding to the last 24 hours. One advantage of a 24-hour period is that even if an FF is flipped to provide the new feature to all users in the last 12 hours, data corresponding to the old feature can still be collected and examined. It will be appreciated that in other examples shorter or longer periods of time may be implemented, such as 12 hours, 1 hour, 30 minutes, etc. Shorter periods are preferable because performance regressions can be identified and dealt with faster, however, it may be possible that a sufficient number of timer event logs cannot be obtained for all FF states when shorter periods are collected and therefore sufficient data may not be available to determine the performance of a feature and/or software application accurately.

As noted previously, at step 306, the regression detection system 150 is supposed to retrieve timer data corresponding to the FF selected at step 304. This can be achieved in many different ways. For example, the regression detection system 150 may request the logging system 130 to forward all timer event log data stored by the logging system 130 that was received from the product platform 120 within the predetermined period of time that has the same unique identifier as the selected FF. In other embodiments, the regression detection system 150 may request the logging system to forward relevant data pertaining to the timer event logs instead of forwarding the entire timer event logs the logging system 130 maintains for that FF in the specified period of time.

For example, for each FF, the regression detection system 150 may request the logging system 130 to forward timer data for each state of the FF. And for each state of the FF (true or false), the regression detection system 150 may also request the logging system to forward relevant data such as the number of timer samples recorded, the time taken to execute the corresponding feature each time it was recorded, and/or statistical data for the timers (such as mean value, average value, p90 value, p99 value, etc.). It will be appreciated that the above example data fields are illustrative and that any other data fields associated with the timers may also be considered relevant and could be retrieved at this step.

An example query to retrieve timer data for a particular FF is depicted in Table F and the corresponding output data for that FF is depicted in Table G.

TABLE F example query to retrieve timer data search "$key"
  | fields - __raw
  | rename ext.jira.request.metrics.work-context-metrics.timers.$key.mean to mean
  | rename ext.jira.request.metrics.work-context-metrics.timers.$key.count to count
  | rename ext.jira.request.metrics.feature__flag__metrics.$key to flag
  | eval totalMs = mean * count / 1000000
  | stats count p90(totalMs) as p90 p99(totalMs) as p99 by flag

TABLE G

Example output from logging system

State,count,p90,p99
false,7404,0.02121796337393542,0.04926696200000006
true,13666,0.051394735446916420,0.110053213398692980

In the example output above, the logging system 130 forwards timer data for all statuses of the selected FF. In particular, for a particular state of the FF, the logging system 130 returns a count of the number of timer results available in the predetermined period of time, the $90^{th}$ percentile (P90) estimate execution time for the corresponding feature, and the $99^{th}$ percentile (P99) estimated execution time for the corresponding feature. The $90^{th}$ percentile means that 90% of the feature execution times for the corresponding FF status fall below the P90 estimate. Similarly, the $99^{th}$ percentile means that 99% of the feature execution times for the corresponding FF status fall below the P99 estimate.

Once the regression detection system 150 retrieves the timer event data for a particular FF, performance of the feature wrapped in each FF can be examined to determine if the feature causes a performance regression in the software application or not.

At step 308, the regression detection system 150 determines whether a threshold number of timer event logs exist for all the FF statuses.

As described previously, an FF may be associated with two versions of a feature—e.g., the original version (A) and the updated version (B). It is also possible for an FF to be associated with multiple versions of a feature—e.g., the original version (A), a first new version (B) and a second new version (C). At step 308 a determination is made whether a sufficient number of timer event logs have been retrieved for each version of the feature associated with an FF. In one embodiment, the regression detection system 150 may compare the number of timer event logs corresponding to each version of the feature with a threshold number (e.g., 100 event logs/version of functionality). If the number of timer event logs matches or exceeds the threshold number, the regression detection system 150 determines that a sufficient number for timer event logs have been retrieved and the method proceeds to step 310 where the regression detection system 150 calculates performance (or estimate execution time) of each version of the feature associated with the selected FF.

The performance (or estimate execution time) can be calculated in many different ways. In one example, for each version of the feature, statistical analysis is performed on the timer execution times. This statistical analysis may be performed by the logging system 130 or the regression detection system 150. For example, where the logging system 130 has analysis capabilities, the logging system 130 may perform the required statistical analysis on the timer data before or when communicating the timer data to the regression detection system 150. For example, as shown in Table G, the logging system 130 may determine the $90^{th}$ percentile (P90) estimate execution time for each version of the feature. In alternate examples, an average function execution time may be determined for each version or a different probabilistic estimate may be computed, such as the $99^{th}$ percentile (P99), or the $80^{th}$ percentile (P80)). It will be appreciated that these are only examples, and other techniques may also be contemplated and these are within the scope of the present disclosure.

In other embodiments, where the logging system 130 is simply a database for storing event data logs and timer event logs, the regression detection system 150 may be configured to perform the statistical analysis on the timer execution times (identified from the retrieved timer event logs). For example, the regression detection system 150 may calculate the $90^{th}$ percentile estimate or the average feature execution time for each version of the feature based on each instance of timer event logs.

Once the performance is calculated for each version of the feature associated with the selected flag, the method proceeds to step 312, where a determination is made whether regression associated with a new version of the feature exceeds a threshold amount. A new version of the feature will be considered to have regressed in performance if estimated execution time of the new version exceeds the estimated execution time of the original version. For example, in the examples above, a functionality would be deemed to have regressed within the P90 estimate if version B is higher (by X milliseconds or Y %) than the P90 estimate of version A. Similarly, if the P90 estimate for the new version of the feature does not exceed the P90 estimate of the original version of the feature, the regression detection system 150 determines that the feature has not regressed in performance. The difference between the estimated execution times is the regression time.

At step 312, if it is determined that a feature has regressed in performance, the regression detection system 150 determines whether the regression time exceeds a threshold value (e.g., 20 ms) or percentage (e.g., 20%). If the regression exceeds the predetermined threshold, the method proceeds to step 314 where the regression detection system 150 identifies the party responsible for the FF.

In one embodiment, the regression detection system generates and forwards an ownership request to the FF system 140. The request includes the unique identifier of the selected FF. It will be appreciated that when an FF is first created, the FF system 140 may be configured to associate the created FF with the product platform it corresponds to, the developer that has requested the FF, the team that the developer belongs to, etc. In some embodiments, the FF system 140 may request the creator of the FF to provide this information at the time of creation of the FF. Alternatively, the FF system 140 may request developers to provide this information (i.e., developer details, team details, and product platform details) when developers first register with the FF system 140 such that the FF system can maintain accounts for developers, teams, and/or product platforms. Thereafter, the FF system 140 may request developers to log into their accounts before they can create or manage FFs. In these cases, the developer, team and product platform details corresponding to a newly created FF may be retrieved from the user account details and associated with the FF when it is created and stored. Accordingly, the FF system 140 maintains a record of the developer, team, and/or product platform that is responsible for each FF maintained by the FF system 140.

At step 314, the FF system 140 queries its own internal data store 144 using the unique identifier of the FF to retrieve and forward the ownership information to the regression detection system 150. The regression detection system 150 in turn sends an alert to the owner(s) of the FF as identified from the ownership information.

The owner(s) may be alerted using any suitable communication method based on the information made available to the regression detection system 150. For example, if email addresses are provided, the regression detection system may generate and forward an email message to the owners informing them of the regression. The email message may also include any suitable analysis data to allow the developers to identify the regression visually. Alternatively, instead of sending the analysis data, a link to an analysis dashboard may be sent to the owners. In other examples, the owners may be alerted via a chat tool (e.g., Slack®), an SMS, or any other suitable notification. In certain embodiments, the developer may be advised to turn off the feature flag until the regression is investigated and fixed.

In other embodiments, if the regression is significant—i.e., it exceeds a predetermined threshold, (e.g., a 200 ms regression or a 30% regression over the original implementation), the regression detection system 150 may automatically request the feature flag system 140 to turn off the feature flag.

Thereafter, the method 300 proceeds to step 316, where the regression detection system 150 determines if all the FFs have been evaluated. If more FFs remain to be evaluated, the method returns to step 304, where a next FF is selected. This method is then repeated until all the FFs are assessed. When no further FFs remain to be evaluated, the method 300 ends.

Up until this point, the 'yes' paths following any decision blocks in flowchart 300 have been described. The following section describes the 'no' paths from the decision blocks in process 300. At step 308, if the regression detection system 150 determines that a threshold number of event logs were not retrieved for a version of the feature, the method proceeds to step 318 where the selected FF is discarded and the method thereafter proceeds to step 316.

At step 312, if the regression detection system 150 determines that none of the new versions of the feature have resulted in a performance regression, the method directly proceeds to step 316.

In some embodiments, at step 312, if it is determined that the new version(s) of the feature do not result in a regression, the regression detection system may determine whether the new version(s) of the feature result in an improvement in this system—e.g., an improvement above a certain threshold value or percentage. A new version of the feature will be considered to have improved in performance if estimated execution time of the new version is lower than the estimated execution time of the original version. The difference between the estimated execution times is the improvement time. If it is determined that the new version(s) of the feature result in an improvement above a certain threshold value or percentage, the regression detection system 150 may be configured to identify the owners and generate a message to notify the owners of the performance improvement.

In method 300, the analysis of the FFs is shown in a sequential manner—i.e., each FF is examined in sequence. However, this is a simplistic depiction, and in reality, two or more of the FFs may be analyzed in parallel. For example, the regression detection system 150 may retrieve timer data for multiple FFs at step 306 and then perform method steps 308-314 in parallel.

Developers often deploy new features to users in an incremental fashion. For example, they may first deploy a new feature so that other developers in the team can access the functionality. Once feedback is positive in this deployment and any bug fixes have been identified and corrected, the feature may be deployed to all the employees of the organization. Thereafter, that is, after the functionality has been tested and used by internal users for a period of time, the feature may be deployed to all users (including external users). To manage this, some organizations maintain different deployment environments. for example, testing, staging, and production. When a feature is deployed to a particular environment, only users that are authorized to access that environment can see the feature. In such cases where there are multiple deployment environments, developers may set their FF rules such that the corresponding feature is enabled for different percentages of users in different environments. For example the FF of a particular feature may be set such that for 100% of the users in the testing environment the new feature is executed, for 50% of the users in the staging environment the new feature is executed whereas for the other 50% of the users the original feature is executed, and for all the users in the production environment the original feature is executed.

In such cases, method 300 may further retrieve event logs corresponding to the different environments and calculate performance regression for a particular feature flag for each environment individually.

It will be appreciated that in some cases, a feature flag may encapsulate multiple code changes (or multiple corresponding features) which are scattered across the codebase. In such cases, timers may be wrapped around individual code changes or features. Whenever a particular feature associated with the feature flag is invoked, the product platform 120 may determine which version of the feature to provide. The timer may then record the time taken to provide that version of the feature and event log data associated with that execution may be recorded and stored by the product platform 120. Subsequently, in method 300, at step 306 when the regression detection system retrieves timer event log data from the logging system for that particular feature flag, it retrieves timer event logs for all the features encapsulated in the feature flag and may aggregate the execution times for different versions of the features encapsulated in the feature flag to determine whether the features collectively result in a regression or not.

It will be appreciated that method 300 is one example method for utilizing FF and timer event log data for determining the performance of corresponding functionalities. In other examples, the one or more method steps may be rearranged, certain steps may be omitted and other steps may be added without departing from the scope of the present disclosure.

In the foregoing specification, embodiments of the invention have been described with reference to numerous specific details that may vary from implementation to implementation. For example, in the foregoing specification, the logging system 130 is depicted as a separate system that is configured to receive event log data from the product platform 120 and store this data. However, in other embodiments, the logging system 130 may be omitted and the product platform 120 may directly save and store the FF and timer event log data in the product platform's data store 124. In this case, if the regression detection system 150 is also executed on the product platform 120, method 300 can be executed within the product platform 120 itself. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

As used herein the terms "include" and "comprise" (and variations of those terms, such as "including", "includes", "comprising", "comprises", "comprised" and the like) are intended to be inclusive and are not intended to exclude further features, components, integers or steps.

Various features of the disclosure have been described using process steps. The functionality/processing of a given process step could potentially be performed in various different ways and by various different systems or system modules. Furthermore, a given process step could be divided into multiple steps and/or multiple steps could be combined into a single step and/or two or more of the steps can be performed in parallel. Furthermore, the order of the steps can be changed and one or more steps can be added or deleted without departing from the scope of the present disclosure. For example, steps to retrieve timer event logs for different environments and calculate performance regression for each environment may be added.

It will be understood that the embodiments disclosed and defined in this specification extends to alternative combinations of two or more of the individual features mentioned or evident from the text or drawings. These different combinations constitute various alternative aspects of the embodiments.

The invention claimed is:

1. A method for detecting performance regression of a feature in a software application, the method comprising:
   retrieving first state execution data comprising execution time data and execution count data corresponding to executions an updated version of the feature;
   retrieving second state execution data comprising execution time data and execution count data corresponding to an original version of the feature;
   determining a first execution time metric from the first state execution data;
   determining a second execution time metric from the second state execution data; and
   in response to determining that the first execution time metric is greater than the second execution time metric, determining and signaling that the updated version of the feature introduces a performance regression.

2. The method of claim 1, wherein the first state execution data comprises execution time data and execution count data corresponding to executions of the feature when a feature flag wrapping the feature is in a first state corresponding to the updated version of the feature.

3. The method of claim 2, wherein the second state execution data comprises execution time data and execution count data corresponding to executions of the feature when the feature flag is in a second state corresponding to the original version of the feature.

4. The method of claim 1, wherein in response to determining that the second execution time metric is greater than the first execution time metric, determining that the updated version of the feature introduces a performance improvement.

5. The method of claim 1, wherein determining that the first execution time metric is greater than the second execution time metric comprises determining whether the first execution time metric is greater than the second execution time metric by at least a threshold value.

6. The method of claim 5, wherein:
   the threshold value is a first threshold value; and
   determining that the first execution time metric is greater than the second execution time metric comprises determining whether the first execution time metric is greater than the second execution time metric by a least a second threshold greater than the first threshold.

7. The method of claim 6, wherein in response to determining that the first execution time metric is greater than the second execution time metric by the second threshold, disabling the updated version of the feature.

8. The method of claim 7, wherein disabling the updated version of the feature comprises setting a feature flag wrapping the feature to a disabled state.

9. The method of claim 1, further comprising generating an alert that the updated version of the feature has introduced a performance regression in the software application.

10. The method of claim 1, further comprising determining that execution count of the first execution data satisfies a threshold prior to determining whether the first execution time metric is greater than the second execution time metric.

11. A method for automatically managing a state of a feature flag controlling a feature of a software application for detecting performance regression introduced by an updated version of the feature, the method comprising:
 determining that the updated version of the feature has been executed at least a first threshold number of times;
 obtaining, from execution log data, first execution data corresponding to executions of the updated version of the feature;
 obtaining, from the execution log data, second execution data corresponding to executions of an original version of the feature; and
 determining from the first execution data and the second execution data that the updated version of the feature introduces a performance regression that exceeds a second threshold, and, in response, setting the feature flag to a disabled state to prevent further execution of the updated version of the feature.

12. The method of claim 11, wherein the first execution data comprises an average execution time of executions of the updated version of the feature.

13. The method of claim 11, wherein the second execution data comprises an average execution time of executions of the original version of the feature.

14. The method of claim 11, further comprising generating a notification to a code owner of the updated version of the feature that the feature flag has been disabled.

15. The method of claim 11, further comprising generating a notification to a code owner of the updated version of the feature that the updated version of the feature introduces the performance regression.

16. The method of claim 11, further comprising determining from the first execution data and the second execution data that the updated version of the feature introduces a performance improvement that exceeds a third threshold, and, in response, setting the feature flag to a enabled state.

17. A method for automatically managing state of a feature flag in a software application, the method comprising:
 obtaining, from execution log data, first execution data corresponding to executions of the software application when the feature flag is in a first state;
 obtaining, from the execution log data, second execution data corresponding to executions of the software application when the feature flag is in a second state; and
 determining from the first execution data and the second execution data that the first state of the feature flag introduces a performance regression that exceeds a threshold, and, in response, automatically setting the feature flag to the second state.

18. The method of claim 17, wherein the first state is associated with an updated version of a feature of the software application.

19. The method of claim 18, wherein the second state is associated with an original version of the feature of the software application.

20. The method of claim 17, wherein determining from the first execution data and the second execution data that the first state of the feature flag introduces a performance regression comprises determining that a first execution time metric determine from the first execution data is greater than a second execution time metric determine from the second execution data.

* * * * *